UNITED STATES PATENT OFFICE.

HOMER W. HILLYER, OF FARMINGTON, CONNECTICUT, ASSIGNOR TO THOMSEN CHEMICAL CO., OF BALTIMORE, MARYLAND, A CORPORATION OF MARYLAND.

SUSPENSIBLE SULFUR AND PROCESS FOR PRODUCING SAME.

1,048,161.      Specification of Letters Patent.      Patented Dec. 24, 1912.

No Drawing.      Application filed October 14, 1910. Serial No. 587,103.

*To all whom it may concern:*

Be it known that I, HOMER W. HILLYER, a citizen of the United States, and a resident of the town of Farmington, county of Hartford, State of Connecticut, have invented certain new and useful Improvements in Suspensible Sulfur and Processes for Producing Same, of which the following is a specification.

This invention has for its object to produce sulfur in a new form or condition so that it will be suspensible in water and not be precipitable from its aqueous suspension upon acidification with sulfuric acid.

Sulfur at present, when carried by water, is readily coagulated or deposited on the application of sulfuric acid to the water. No form of sulfur is known in the arts which will fail to be thus precipitated under the influence of acid. For many purposes it is extremely important to produce my new form of sulfur being sulfur which will remain suspended even when acid is applied. Among such uses is its efficiency in a spray to destroy fungous growths on plants.

My invention comprises the process of producing sulfur, having the properties mentioned, with the aid of a colloid in manner hereinafter specified.

My invention also consists in the new form of sulfur which results from the said process.

In order to carry out my invention, I grind crude or other sulfur such as flowers of sulfur, precipitated sulfur or flour of sulfur to a fineness so that it passes through a sieve having say sixteen meshes to the inch, and then gradually add to the powder while still grinding, a solution of glue in water and continue to grind until an impalpable condition of the sulfur results. In using glue as the colloid, I find that fifty (50) parts of crude sulfur to five (5) parts of glue in fifty (50) parts of water give good results. Parts are given by weight. I have further found that other colloids such as soap bark extract, Irish moss, gum tragacanth and gum arabic may be used as equivalents of the glue. When using gum arabic I follow the same treatment as that just described with reference to glue. When using gum tragacanth, I need in the same process but one part of gum to fifty parts of water and fifty parts of sulfur. In using extract of soap bark I mix ten (10) parts of tincture of soap bark with forty (40) parts of water and grind with fifty (50) parts of sulfur. When using Irish moss, I boil fifty (50) parts of water and one part of Irish moss for about an hour, replacing the evaporated water from time to time then cooling the mixture, then adding it to the fifty (50) parts of sulfur while grinding the same as hereinabove described, when using glue solution. When the sulfur is ground with the colloid and sufficient water used, the product becomes creamy in consistency and the product when mixed with a large amount of water makes a milky fluid from which the sulfur cannot be coagulated or precipitated by sulfuric acid. The sulfur can also be ground dry with the dry colloid in about the proportions stated and to the proper extent. The dry powder so obtained, when afterward mixed with water, yields a suspensible sulfur which is not deposited or coagulated by sulfuric acid. A similar dry powder can be obtained by suitably evaporating to dryness the product obtained by grinding sulfur with, say, glue in the presence of water.

If the sulfur resulting from my process should contain particles not finely divided, such coarser particles will not resist deposition or coagulation, but they constitute an impurity. I apply the term colloid to the glue, the gums and the moss hereinabove mentioned and to other gelatinous substances known as equivalents of those mentioned. Instead of water any other neutral liquid vehicle may be used. My new product even when separated from the colloid can be distinguished from all other products, heretofore described in literature or known, by the following test which I illustrate on my product containing about 50% of its weight of sulfur. Dilute five (5) grams of my product with one hundred (100) cubic centimeters of distilled water and allow to stand in a graduated cylinder $1\frac{1}{8}$ inches internal diameter for five minutes. The upper ten (10) cubic centimeters are then decanted and one cubic centimeter of sulfuric acid of strength of 63% is added thereto. After stirring gently, it is allowed to stand for a reasonable length of time, say five minutes. At the end of that time no clotting or precipitation of sulfur is noticeable. If this test is to be applied to a product of a strength different from the one above given, namely, fifty (50) per centum by weight of sulfur, the amounts thereof and of the distilled water used for dilution, shall be so selected that 20 cc. of the total water in the dilution will correspond approximately to one-half (½) gram of sulfur contained in the material originally taken for the test.

In the foregoing test I have mentioned one part of sulfuric acid to ten parts of the decanted liquid. This proportion of sulfuric acid or any smaller proportion will not cause precipitation and is a reliable way of testing the characteristic of the product.

My improved material is adapted to many uses, one of which is as fungicide applicable to shrubs or plants as spray. To such a fungicide, a suitable insecticide may be added in suitable proportions, for example, to 1000 parts of my product containing 50% of sulfur I may add 150 parts of a lead arsenate pulp containing 50% of lead arsenate, but I want it clearly understood that when I use the word "fungicide" in this specification, I mean the new form of sulfur herein described without reference to the uses to which it may be put.

I claim:

1. The new form of sulfur herein described, being suspensible sulfur, which when suspended in water is not coagulable by sulfuric acid when tested substantially as herein described.

2. The herein described fungicide being a composition of matter containing suspensible sulfur which will remain suspended in water and not be coagulated by sulfuric acid when tested substantially as herein described.

3. As a new product, a fungicide being a composition of matter containing suspensible sulfur, a liquid vehicle and a colloid, and characterized by its inability to be coagulated by sulfuric acid, substantially as described.

4. As a new product, a fungicide being a composition of matter containing suspensible sulfur, water and a colloid, and characterized by its inability to be coagulated by sulfuric acid, substantially as described.

5. As a new product, a fungicide being a composition of matter containing a liquid vehicle, suspensible sulfur which cannot be coagulated by sulfuric acid, a colloid and an insecticide, substantially as described.

6. As a new product, a fungicide being a composition of matter containing a liquid vehicle, suspensible sulfur which cannot be coagulated by sulfuric acid, a colloid and lead arsenate, substantially as described.

7. The process of producing a fungicide containing suspensible sulfur, which process comprises grinding sulfur with a colloid until it becomes suspensible in water and not coagulable by sulfuric acid.

8. The process of producing a fungicide containing suspensible sulfur, which process comprises grinding sulfur with a colloid and a liquid vehicle until it becomes suspensible in water and not coagulable by sulfuric acid.

9. The process of producing a fungicide containing suspensible sulfur which comprises grinding sulfur with a colloid and water until it becomes suspensible in water and not coagulable by sulfuric acid.

In testimony whereof I have hereunto set my hand in the presence of two subscribing witnesses.

HOMER W. HILLYER.

Witnesses:
ARTHUR V. BRIESEN,
JOHN A. KEHLENBECK.